TRANSISTORIZED RING-TYPE PULSE GENERATOR INCLUDING SATURABLE CORE TRANSFORMERS TO CONTROL PULSE WIDTHS AND REPETITION RATE

Filed July 6, 1962

INVENTOR
JOSEPH M. MARZOLF, Jr

Glenn S. Orzevik
AGENT

BY Richard C. Reed
ATTORNEY 3,114,048

TRANSISTORIZED RING-TYPE PULSE GENERATOR INCLUDING SATURABLE CORE TRANSFORMERS TO CONTROL PULSE WIDTHS AND REPETITION RATE

Joseph M. Marzolf, Jr., Falls Church, Va., assignor to the United States of America as represented by the Secretary of the Navy Filed July 6, 1962, Ser. No. 208,150
2 Claims. (Cl. 307—88)
(Granted under Title 35, U.S. Code (1952), sec. 266)

The invention described herein may be manufactured and used by or for the Government of the United States of America for governmental purposes without the payment of any royalties thereon or therefor.

This invention relates in general to means for producing trigger pulses in fixed sequence and in particular to devices utilizing saturable cores.

It will be appreciated that trigger pulses are often employed to initiate the operation of one or more functions, as desired, in a wide variety of electronic control applications. Generally, these control applications have unique requirements involving time delay between pulses, pulse duration, pulse shape, reliability, size, weight, sensitivity, etc. For example, high power static inverter control applications present a complexity problem in the sequential switching and adding of several square wave outputs which must be minimized in remote unattended operations where reliability as well as size and weight may be factors of paramount importance.

Accordingly, it is an object of this invention to provide a high power self-generating pulse source of the ring counter variety which is suitable for use in static inverter applications.

It is another object of this invention to provide a simplified pulse generating means suitable for use in high power applications involving long time delays.

It is still another object of this invention to provide a simplified pulse generating means having minimum size, weight and current drain requirements.

Other objects will become apparent upon a more comprehensive understanding of the invention for which reference is had to the following specification and drawings wherein.

Figure 1:
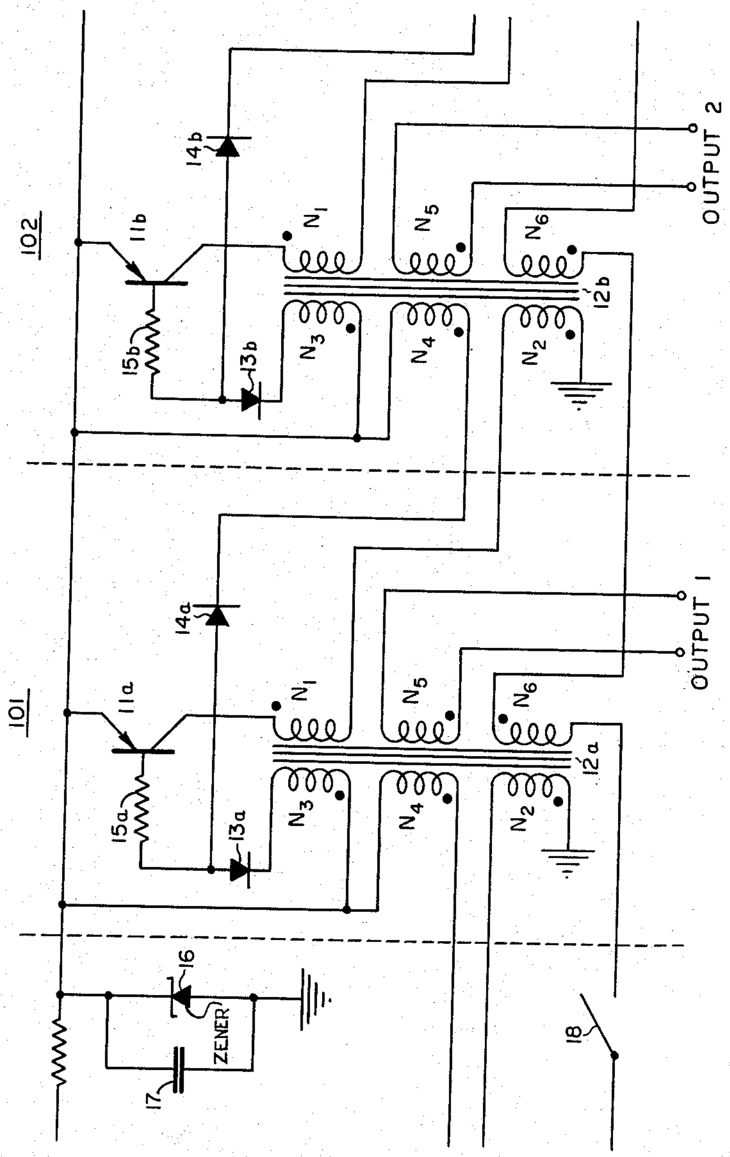
FIG. 1 is a schematic diagram of a preferred embodiment of this invention.

Briefly, the device of this invention is a transistorized ring-type pulse generator which affords a relatively simple means of obtaining a repetitive sequence of high power timed pulses in separate output circuits suitable for triggering purposes. In a preferred embodiment, the output circuits are electrically insulated from the rest of the circuit and consequently either positive or negative polarity may be obtained. Also, in the preferred embodiment, the timing interval is based on the time required for a given transformer core to change from negative to positive saturation and vice versa when a step function of voltage is applied to the primary winding. Thus by changing the number of stages, size of core, number of turns, and input voltage, a wide range of timing intervals can be obtained.

Referring now to the drawings:

FIG. 1 shows two successive stages, 101 and 102, of any number of substantially identical stages that can be connected in series before the loop is closed. As shown in the drawing, each stage consists of a transistor 11, a square loop magnetic core 12, diodes 13 and 14 and a resistor 15, which are designated by the subscript *a* and *b* in the stages 101 and 102, respectively.

Each of the cores 12*a* and *b* includes six separate windings, $N_1$, $N_2$, $N_3$, $N_4$, $N_5$ and $N_6$ which in a preferred embodiment have a turns relationship 53, 6, 57, 7, 20 and 2, respectively, for reasons which will become apparent hereinafter.

In operational analysis, each of the cores is initially set by a current through coils $N_6$ in such a direction that core 12*a* is saturated negatively and all others are saturated positively.

As soon as the setting current is removed, transistor 11*a* starts conducting. This action may be initiated by either or both of two causes. Any small leakage current through transistor 11*a* and coil $N_1$ will generate a voltage in $N_3$, causing transistor 11*a* to conduct. Also the removal of the setting current causes the operating point of core 12*a* to drop from a high negative value (beyond G in FIG. 2) to point A. The slight slope of this portion of the curve will cause a small voltage to be generated in coil $N_3$ of core 12*a* which will drive transistor 11*a* further into conduction. These effects are cumulative, and the current increases through transistor 11*a* until it is fully conducting.

Figure 2:
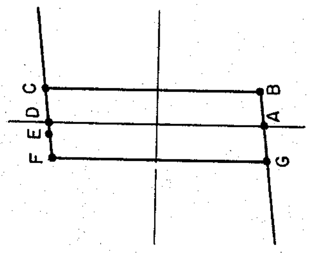
FIG. 2 is a graphical showing of an idealized hysteresis loop for the magnetic cores in this invention.

The collector current, passing through $N_1$ of core 12*a* causes the flux to change from points A to B to C in FIG. 2. During this period, the voltage generated in coil $N_3$ of core 12*a* supplies the base current for maintaining transistor 11*a* in the saturated conducting state. Also in this interval, the collector current is limited by coil $N_1$, since for a given core the abscissa of point B in FIG. 2 will be a function of the ampere-turns in the magnetizing coil $N_1$. The current will therefore be limited to this particular value until positive saturation (point C) is reached, after which it will increase until limited by other elements in the circuit.

It will be noted that this same current also passes through coil $N_2$ of core 12*b*. However, although this current is in the right direction to drive core 12*b* from positive to negative saturation, it is insufficient in magnitude to affect core 12*b*, since both cores 12*a* and *b* are identical and since $N_1$ has a much larger number of turns than $N_2$. Thus the operating point of core 12*b* will shift from D to E (FIG. 2) but will remain in the positive-saturated condition.

After core 12 reaches the positive-saturated condition (point C of FIG. 2), coil $N_1$ will no longer limit the current, which will increase until limited by coil $N_2$ of core 12*b* in the same manner that $N_1$ previously limited it. Core 12*b* can now be driven from positive to negative saturation (point F to G in FIG. 2) by the current in $N_2$. During this interval, the voltage generated in $N_3$ of core 12*a* will disappear, because core 12*a* is saturated and the flux is not changing. However, the changing flux in core 12*b* will generate a voltage in $N_4$ of core 12*b* to supply the base current of transistor 11*a*, which is thus maintained in the conducting condition.

When core 12*b* reaches negative saturation (point G in FIG. 2), the voltage generated by coil $N_4$ on core 12*b* will disappear, and transistor 11*a* will cut off. At the same time, since core 12*b* has now been driven to negative saturation by $N_2$, transistor 11*b* will now start to conduct, and its collector current through $N_1$ of core 12*b* will drive core 12*b* from negative to positive saturation. Coil $N_3$ of core 12*b* will supply the base current of transistor 11*b*.

Thus a cycle similar to that described above for cores 12*a* and 12*b* will now be repeated for the cores 12*b* and 12*c* of the next stage 103, now shown. Coil $N_5$ on each core provides an output pulse each time its associated core changes its magnetic state. The output consists of a short, high-amplitude pulse followed immediately by a negative, low-amplitude pulse of longer duration. Each output is electrically insulated from the rest of the circuit; consequently the polarity of the pulse may be reversed by changing the output terminals. It will be appreciated that either pulse may be isolated by including a series rectifier, not shown, in each output circuit.

Thus the time durations of the pulses can be varied by changing the size of the cores, the number of turns, or the input voltage. This can be computed from the equation $$E=N\frac{2BA}{t}10^{-8}$$

where:

E is the voltage across the coil
N is the number of turns on the coil
B is the maximum flux density for the given core material in gausses
A is the cross-sectional area of the core in square centimeters
$t$ is the time duration of the desired pulse in seconds It will be noted that the positive and negative portions of the cycle are not the same duration. The number of turns on coil $N_2$ determines the positive portion and $N_1$ determines the negative portion of the cycle. This equation is exact for the given core, but if the input voltage is maintained constant (which is the function of the Zener diode 16 in FIG. 1) the actual voltage across the coils will depend slightly upon the voltage drop across the transistors and miscellaneous circuit resistances. By adjusting the number of turns on the cores, pulse durations sufficiently accurate for nearly all practical applications may be obtained. If more precise intervals are required, series resistances, not shown, may be inserted for minor adjustments.

It has been found that transistors having high voltage ratings should be used, the value depending on the ratio of turns between $N_1$ and $N_2$ and also on the input voltage. During the interval when $N_2$ is driving its core, a high voltage is generated in $N_1$ on the same core. This voltage is impressed across its associated transistor, which is in the cutoff condition. The transistor must be able to withstand this voltage without breaking down. Transistor type 2N174 has been found to be satisfactory for the purpose.

It will be appreciated that this circuit would be useful in any application requiring successive pulses at fixed intervals, particularly where successive pulses must be routed through different but related, circuits. A typical application of this nature would be the synchronization of the various phases of a multiphase static inverter.

This invention also will provide a means of obtaining successive pulses separated by a relatively long time interval. In general, this is difficult to obtain electronically, but by varying the input voltage, the number of stages employed, the size of the cores, and number of turns used, any reasonable time delay may be obtained between pulses, making the device of this invention useful for timing or delay-circuit applications.

In a typical embodiment as shown, transistors 11a and 11b might be type 2N174, the input voltage source applied across the emitter collector of the transistors might be 6V and the windings $N_1$, $N_2$, $N_3$, $N_4$, $N_5$ and $N_6$ might be 53 turns, 6 turns, 57 turns, 7 turns, 20 turns, and 2 turns, respectively. It will be appreciated, of course, that the values listed above are characteristic of one selected operative embodiment and are flexible. That is, these values are not to be considered as component value limitations in all other operative embodiments.

The embodiment of the present invention described in detail herein is merely illustrative of the invention and various modifications in accordance with the present understanding in the art and within the purview of this disclosure are permissible. Therefore it is understood that this invention is only to be limited by the scope of the claims appended hereto.

1. A ring-type pulse generator for producing pulses in selected sequence comprising a first voltage source and at least two substantially identical and cascade connected in a loop pulse generating stages, each stage including a semi-conductor device having at least first and second impedance paths, first and second unidirectional means and a ferromagnetic core of the rectangular hysteresis loop variety having at least first, second, third, fourth and fifth windings thereon; said first unidirectional means and said first winding of its respective stage connected in series across said first impedance path of said semi-conductor device to form a first loop; said second unidirectional means and said second winding of the next adjacent stage in said cascade connection thereof connected in series across said first impedance path of said semiconductor device to form a second loop; means connecting said second impedance path of said semiconductor device, said third winding of its respective stage and said fourth winding of the next adjacent stage in said cascade connection thereof in series across said first voltage source; means including on-off means for energizing said fifth winding in each of said stages, said fifth winding in each stage adapted to produce a saturation condition in each respective core when energized such that the core in one of said stages is in a saturation condition of one selected sense and the cores in the remainder of said stages are in a saturation condition of the opposite sense, said third winding having a substantially greater number of turns with respect to the number of turns of said fourth winding, and core saturation condition responsive means associated with each of said cores.

2. A ring-type pulse generator as defined in claim 1 wherein said core has a sixth winding thereon and said core saturation condition responsive means comprises pulse utilization means connected across said sixth winding.

References Cited in the file of this patent

UNITED STATES PATENTS

| | | |
|---|---|---|
| 2,902,609 | Ostroff et al. | Sept. 1, 1959 |
| 2,963,688 | Hiroshi Amemiya | Dec. 6, 1960 |
| 3,063,038 | Davis et al. | Nov. 6, 1962 |